(12) United States Patent
Kane et al.

(10) Patent No.: US 8,436,912 B2
(45) Date of Patent: May 7, 2013

(54) RANGE MEASUREMENT USING MULTIPLE CODED APERTURES

(75) Inventors: Paul J. Kane, Rochester, NY (US); Sen Wang, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 373 days.

(21) Appl. No.: 12/770,822

(22) Filed: Apr. 30, 2010

(65) Prior Publication Data

US 2011/0267486 A1    Nov. 3, 2011

(51) Int. Cl.
*G06K 9/00* (2006.01)
*G06K 9/36* (2006.01)

(52) U.S. Cl.
USPC .................. 348/222.1; 348/335; 396/89

(58) Field of Classification Search .................. None
See application file for complete search history.

(56) References Cited

U.S. PATENT DOCUMENTS

| | | | |
|---|---|---|---|
| 8,017,899 B2* | 9/2011 | Levenets et al. ............ | 250/208.1 |
| 2002/0075990 A1* | 6/2002 | Lanza et al. .................. | 378/2 |
| 2002/0149691 A1* | 10/2002 | Pereira et al. ................ | 348/335 |
| 2005/0030625 A1* | 2/2005 | Cattin-Liebl ................. | 359/560 |
| 2009/0016481 A1* | 1/2009 | Slinger ......................... | 378/2 |
| 2009/0020714 A1* | 1/2009 | Slinger ......................... | 250/550 |
| 2009/0028451 A1 | 1/2009 | Slinger et al. | |
| 2009/0090868 A1* | 4/2009 | Payne ........................... | 250/363.06 |
| 2009/0091633 A1* | 4/2009 | Tamaru ........................ | 348/208.14 |
| 2010/0110179 A1* | 5/2010 | Zalevsky et al. ............. | 348/135 |
| 2010/0220212 A1* | 9/2010 | Perlman et al. .............. | 348/229.1 |

OTHER PUBLICATIONS

Sazbon, D., et al. "Qualitative Real-Time Range Extraction for Preplanned Scene Partitioning Using Laser Beam Coding," Apr. 29, 2005, Pattern Recognition Letters, vol. 26, 2005.*
Hiura, S., et al. "Depth Measurement by the Multi-Focus Camera," Jun. 23, 1998, 1998 IEEE Computer Society Conference on Computer Vision and Pattern Recognition, p. 953-959.*
Busboom, et al. "Coded Aperture Imaging with Multiple Measurements." Journal of the Optical Society of America; May 1997. 14:5, 1058-1065.*
A.N. Rajagopalan et al.: "An MRF Model-Based Approach to Simultaneous Recovery of Depth and Restoration From Defocused Images", IEEE Transactions on Pattern Analysis and Machine Intelligence, IEEE Service Center, Los Alamitos, CA, US, vol. 21, No. 7, Jul. 1, 1999, pp. 577-589, XP000832594, ISSN: 0162-8828, DOI: DOI: 10.1109/34.777369, the whole document.

(Continued)

*Primary Examiner* — Chieh M Fan
*Assistant Examiner* — Dwight C Tejano

(57) ABSTRACT

A method of using an image capture device to identify range information for objects in a scene includes providing an image capture device having an image sensor, at least two coded apertures, and a lens; storing in a memory a set of blur parameters derived from range calibration data for each coded aperture; capturing images of the scene having a plurality of objects using each of the coded apertures; providing a set of deblurred images using the captured images from each coded aperture and each of the blur parameters from the stored set; and using the set of deblurred images to determine the range information for the objects in the scene.

18 Claims, 12 Drawing Sheets

OTHER PUBLICATIONS

V.M. Bove, Pictorial Applications for Range Sensing Cameras, SPIE vol. 901, pp. 10-17, 1988.

J.W. Goodman, Introduction to Fourier Optics, MCGraw-Hill, San Francisco, 1968, pp. 113-117.

Veeraraghaven et al, Dappled Photography: Mask Enhanced Cameras for heterodyned Light Fields and Coded Aperture refocusing, ACM Transactions on graphics 26 (3), Jul. 2007, paper 69.

Levin et al, Image and Depth from a Conventional camera with a Coded Aperture, ACM Transactions on Graphics 26 (3), Jul. 2007, paper 70.

Dr. Arthur Cox, A Survey of Zoom Lenses, SPIE vol. 3129,0277-786x/97.

* cited by examiner

FIG. 9

RANGE MEASUREMENT USING MULTIPLE CODED APERTURES

CROSS REFERENCE TO RELATED APPLICATIONS

Reference is made to commonly assigned, co-pending U.S. patent application Ser. No. 12/612,135, filed Nov. 4, 2009, entitled Image deblurring using a combined differential image, by Sen Weng, et al, co-pending U.S. patent application Ser. No. 12/770,810, filed concurrently herewith and entitled "Range measurement using coded aperture", by Paul J. Kane, et al, co-pending U.S. patent application Ser. No. 12/770,830 filed concurrently herewith and entitled Range measurement using a zoom camera, by Paul J. Kane, et al, co-pending U.S. patent application Ser. No. 12/770,894, filed concurrently herewith and entitled Digital camera with coded aperture rangefinder, by Paul J. Kane, et al, and co-pending U.S. patent application Ser. No. 12/770,919, filed concurrently herewith and entitled Range measurement using symmetric coded apertures, by Paul J. Kane, et al, all of which are incorporated herein by reference.

FIELD OF THE INVENTION

The present invention relates to an image capture device that is capable of determining range information for objects in a scene, and in particular a capture device that uses coded apertures and computational algorithms to efficiently determine the range information.

BACKGROUND OF THE INVENTION

Optical imaging systems are designed to create a focused image of scene objects over a specified range of distances. The image is in sharpest focus in a two dimensional (2D) plane in the image space, called the focal or image plane. From geometrical optics, a perfect focal relationship between a scene object and the image plane exists only for combinations of object and image distances that obey the thin lens equation:

$$\frac{1}{f} = \frac{1}{s} + \frac{1}{s'} \quad (1)$$

where f is the focal length of the lens, s is the distance from the object to the lens, and s' is the distance from the lens to the image plane. This equation holds for a single thin lens, but it is well known that thick lenses, compound lenses and more complex optical systems are modeled as a single thin lens with an effective focal length f. Alternatively, complex systems are modeled using the construct of principal planes, with the object and image distances s, s' measured from these planes, and using the effective focal length in the above equation, hereafter referred to as the lens equation.

It is also known that once a system is focused on an object at distance $s_1$, in general only objects at this distance are in sharp focus at the corresponding image plane located at distance $s_1'$. An object at a different distance $s_2$ produces its sharpest image at the corresponding image distance $s_2'$, determined by the lens equation. If the system is focused at $s_1$, an object at $s_2$ produces a defocused, blurred image at the image plane located at $s_1'$. The degree of blur depends on the difference between the two object distances, $s_1$ and $s_2$, the focal length f of the lens, and the aperture of the lens as measured by the f-number, denoted f/#. For example, FIG. 1 shows a single lens 10 having clear aperture of diameter D. The on-axis point $P_1$ of an object located at distance $s_1$ is imaged at point $P_1'$ at distance $s_1'$ from the lens. The on-axis point $P_2$ of an object located at distance $s_2$ is imaged at point $P_2'$ at distance $s_2'$ from the lens. Tracing rays from these object points, axial rays 20 and 22 converge on image point $P_1'$, while axial rays 24 and 26 converge on image point $P_2'$, then intercept the image plane of $P_1'$ where they are separated by a distance d. In an optical system with circular symmetry, the distribution of rays emanating from $P_2$ over all directions results in a circle of diameter d at the image plane of $P_1'$, which is called the blur circle or circle of confusion.

On-axis point $P_1$ moves farther from the lens, tending towards infinity, it is clear from the lens equation that $s_1'=f$. This leads to the usual definition of the f-number as f/#=f/D. At finite distances, the working f-number is defined as $(f/\#)_w=f/s_1'$. In either case, it is clear that the f-number is an angular measure of the cone of light reaching the image plane, which in turn is related to the diameter of the blur circle d. In fact, it is shown that $$d = \frac{f}{(f/\#)s_2'}|s_2' - s_1'|. \quad (2)$$

By accurate measure of the focal length and f-number of a lens, and the diameter d of the blur circle for various objects in a two dimensional image plane, in principle it is possible to obtain depth information for objects in the scene by inverting the Eq. (2), and applying the lens equation to relate the object and image distances. This requires careful calibration of the optical system at one or more known object distances, at which point the remaining task is the accurate determination of the blur circle diameter d.

The above discussion establishes the basic principles behind passive optical ranging methods based on focus. That is, methods based on existing illumination (passive) that analyze the degree of focus of scene objects, and relate this to their distance from the camera. Such methods are divided into two categories: depth from defocus methods assume that the camera is focused once, and that a single image is captured and analyzed for depth, whereas depth from focus methods assume that multiple images are captured at different focus positions, and the parameters of the different camera settings are used to infer the depth of scene objects.

The method presented above provides insight into the problem of depth recovery, but unfortunately is oversimplified and not robust in practice. Based on geometrical optics, it predicts that the out-of-focus image of each object point is a uniform circular disk or blur circle. In practice, diffraction effects and lens aberrations lead to a more complicated light distribution, characterized by a point spread function (psf), specifying the intensity of the light at any point (x,y) in the image plane due to a point light source in the object plane. As explained by Bove (V. M. Bove, *Pictorial Applications for Range Sensing Cameras*, SPIE vol. 901, pp. 10-17, 1988), the defocusing process is more accurately modeled as a convolution of the image intensities with a depth-dependent psf:

$$i_{def}(x,y;z)=i(x,y)*h(x,y;z), \quad (3)$$

where $i_{def}(x,y;z)$ is the defocused image, $i(x,y)$ is the in-focus image, $h(x,y;z)$ is the depth-dependent psf and * denotes convolution. In the Fourier domain, this is written:

$$I_{def}(v_x,v_y)=I(v_x,v_y)H(v_x,v_y;z), \quad (4)$$

where $I_{def}(v_x,v_y)$ is the Fourier transform of the defocused image, $I(v_x,v_y)$ is the Fourier transform of the in-focus image, and $H(v_x,v_y;z)$ is the Fourier transform of the depth-dependent psf. Note that the Fourier Transform of the psf is the Optical Transfer Function, or OTF. Bove describes a depth-from-focus method, in which it is assumed that the psf is circularly symmetric, i.e. $h(x,y;z)=h(r;z)$ and $H(v_x,v_y;z)=H(\rho;z)$, where r and $\rho$ are radii in the spatial and spatial frequency domains, respectively. Two images are captured, one with a small camera aperture (long depth of focus) and one with a large camera aperture (small depth of focus). The Discrete Fourier Transform (DFT) is taken of corresponding windowed blocks in the two images, followed by a radial average of the resulting power spectra, meaning that an average value of the spectrum is computed at a series of radial distances from the origin in frequency space, over the 360 degree angle. At that point the radially averaged power spectra of the long and short depth of field (DOF) images are used to compute an estimate for $H(\rho,z)$ at corresponding windowed blocks, assuming that each block represents a scene element at a different distance z from the camera. The system is calibrated using a scene containing objects at known distances $[z_1, z_2, \ldots z_n]$ to characterize $H(\rho;z)$, which then is related to the blur circle diameter. A regression of the blur circle diameter vs. distance z then leads to a depth or range map for the image, with a resolution corresponding to the size of the blocks chosen for the DFT.

Methods based on blur circle regression have been shown to produce reliable depth estimates. Depth resolution is limited by the fact that the blur circle diameter changes rapidly near focus, but very slowly away from focus, and the behavior is asymmetric with respect to the focal position. Also, despite the fact that the method is based on analysis of the point spread function, it relies on a single metric (blur circle diameter) derived from the psf.

Other depth from defocus methods seek to engineer the behavior of the psf as a function of defocus in a predictable way. By producing a controlled depth-dependent blurring function, this information is used to deblur the image and infer the depth of scene objects based on the results of the deblurring operations. There are two main parts to this problem: the control of the psf behavior, and deblurring of the image, given the psf as a function of defocus. The psf behavior is controlled by placing a mask into the optical system, typically at the plane of the aperture stop. For example, FIG. 2 shows a schematic of an optical system from the prior art with two lenses 30 and 34, and a binary transmittance mask 32 including an array of holes, placed in between. In most cases, the mask is the element in the system that limits the bundle of light rays that propagate from an axial object point, and is therefore by definition the aperture stop. If the lenses are reasonably free from aberrations, the mask, combined with diffraction effects, will largely determine the psf and OTF (see J. W. Goodman, *Introduction to Fourier Optics*, McGraw-Hill, San Francisco, 1968, pp. 113-117). This observation is the working principle behind the encoded blur or coded aperture methods. In one example of the prior art, Veeraraghavan et al (*Dappled Photography: Mask Enhanced Cameras for Heterodyned Light Fields and Coded Aperture Refocusing*, ACM Transactions on Graphics 26 (3), July 2007, paper 69) demonstrate that a broadband frequency mask composed of square, uniformly transmitting cells can preserve high spatial frequencies during defocus blurring. By assuming that the defocus psf is a scaled version of the aperture mask, a valid assumption when diffraction effects are negligible, the authors show that depth information is obtained by deblurring. This requires solving the deconvolution problem, i.e. inverting Eq. (3) to obtain $h(x,y;z)$ for the relevant values of z. In principle, it is easier to invert the spatial frequency domain counterpart of this equation, namely Eq. (4) which is done at frequencies for which $H(v_x,v_y;z)$ is nonzero.

In practice, finding a unique solution for deconvolution is well known as a challenging problem. Veeraraghavan et al. solve the problem by first assuming the scene is composed of discrete depth layers, and then forming an estimate of the number of layers in the scene. Then, the scale of the psf is estimated for each layer separately, using the model $$h(x,y,z)=m(k(z)x/w,k(z)y/w), \qquad (5)$$

where $m(x,y)$ is the mask transmittance function, $k(z)$ is the number of pixels in the psf at depth z, and w is the number of cells in the 2D mask. The authors apply a model for the distribution of image gradients, along with Eq. (5) for the psf, to deconvolve the image once for each assumed depth layer in the scene. The results of the deconvolutions are desirable only for those psfs whose scale they match, thereby indicating the corresponding depth of the region. These results are limited in scope to systems behaving according to the mask scaling model of Eq. (5), and masks composed of uniform, square cells.

Levin et al (*Image and Depth from a Conventional Camera with a Coded Aperture*, ACM Transactions on Graphics 26 (3), July 2007, paper 70) follow a similar approach to Veeraraghavan, however, Levin et al rely on direct photography of a test pattern at a series of defocused image planes, to infer the psf as a function of defocus. Also, Levin et al. investigated a number of different mask designs in an attempt to arrive at an optimum coded aperture. They assume a Gaussian distribution of sparse image gradients, along with a Gaussian noise model, in their deconvolution algorithm. Therefore, the coded aperture solution is dependent on assumptions made in the deconvolution analysis.

SUMMARY OF THE INVENTION

The present invention represents a method for using an image capture device to identify range information for objects in a scene, comprising:

a) providing an image capture device having an image sensor, at least two coded apertures, and a lens;

b) storing in a memory a set of blur parameters derived from range calibration data for each coded aperture;

c) capturing images of the scene having a plurality of objects using each of the coded apertures;

d) providing a set of deblurred images using the captured images from each coded aperture and each of the blur parameters from the stored set; and e) using the set of deblurred images to determine the range information for the objects in the scene.

This invention has the advantage that it produces range estimates based on capture devices with two or more coded apertures, which has increased flexibility of operation and produces improved range estimates.

BRIEF DESCRIPTION OF THE DRAWINGS

FIG. 9 is a schematic showing an array of indices centered on a current pixel location according to one embodiment of the present invention.

DETAILED DESCRIPTION OF THE INVENTION

In the following description, some embodiments of the present invention will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein are selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
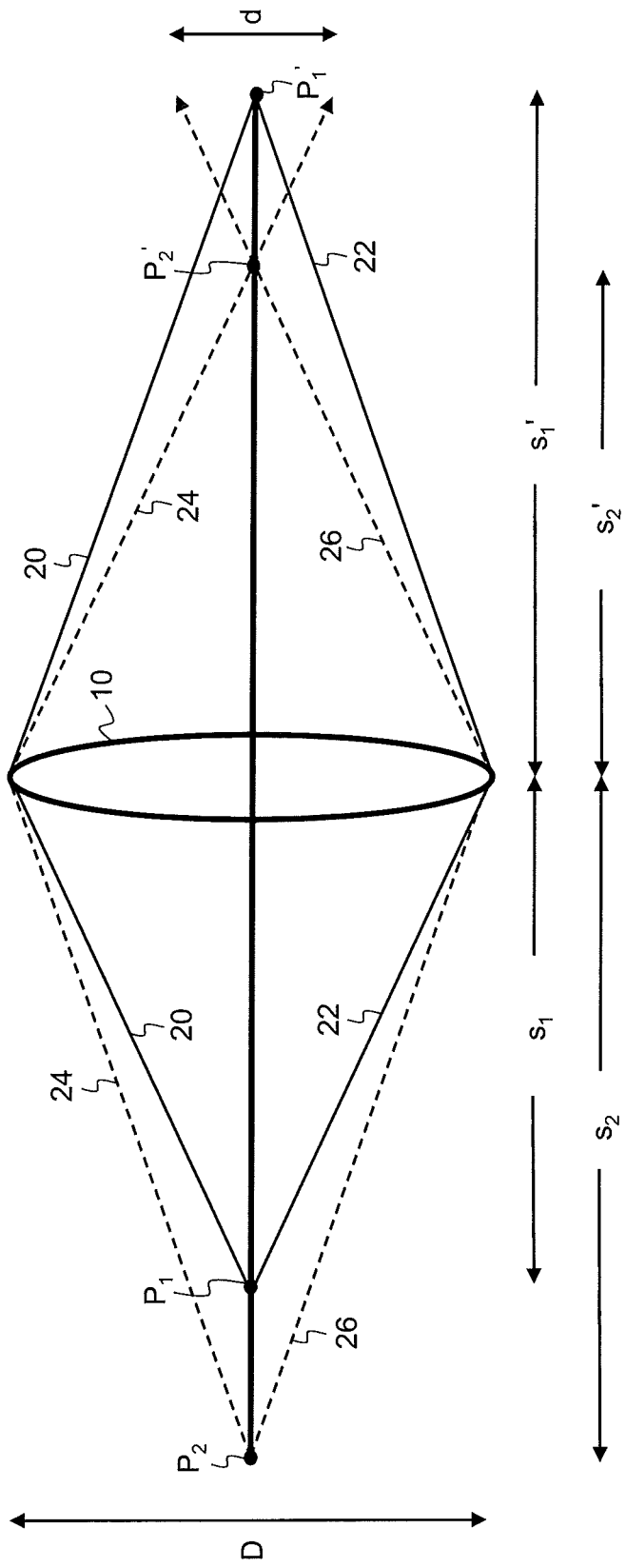
FIG. 1 is a schematic of a single lens optical system as known in the prior art.
Figure 2:
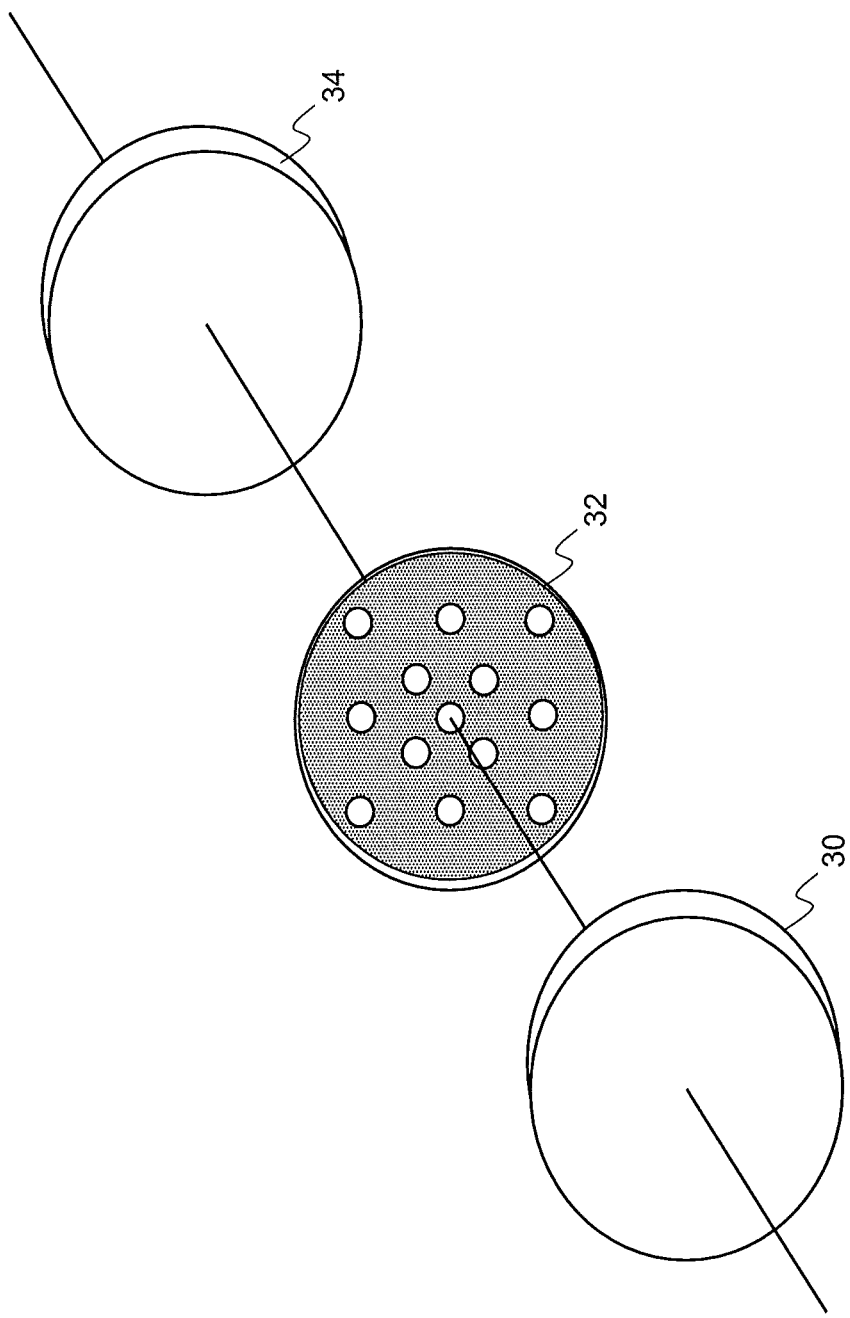
FIG. 2 is a schematic of an optical system with a coded aperture mask as known in the prior art.
Figure 3:
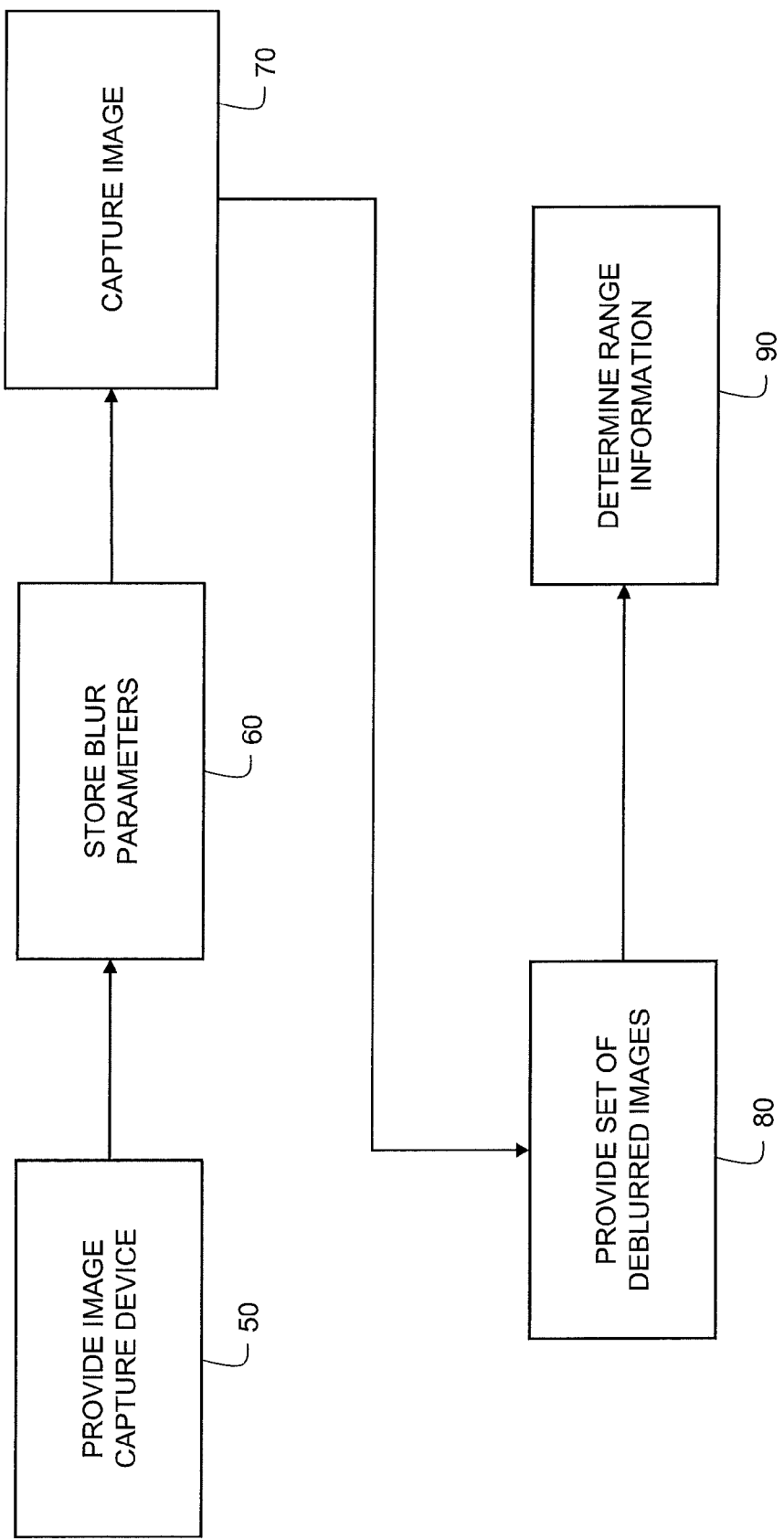
FIG. 3 is a flow chart showing the steps of a method of using an image capture device to identify range information for objects in a scene according to one embodiment of the present invention.

FIG. 3 is a flow chart showing the steps of a method of using an image capture device to identify range information for objects in a scene according to an embodiment of the present invention. The method includes the steps of: providing an image capture device 50 having an image sensor, at least two coded apertures, and a lens; storing in a memory 60 a set of blur parameters derived from range calibration data for each coded aperture; capturing images of the scene 70 having a plurality of objects using each of the coded apertures, providing a set of deblurred images 80 using the capture image and each of the blur parameters from the stored set; and using the set of blurred images to determine the range information 90 for objects in the scene.

Figure 4:
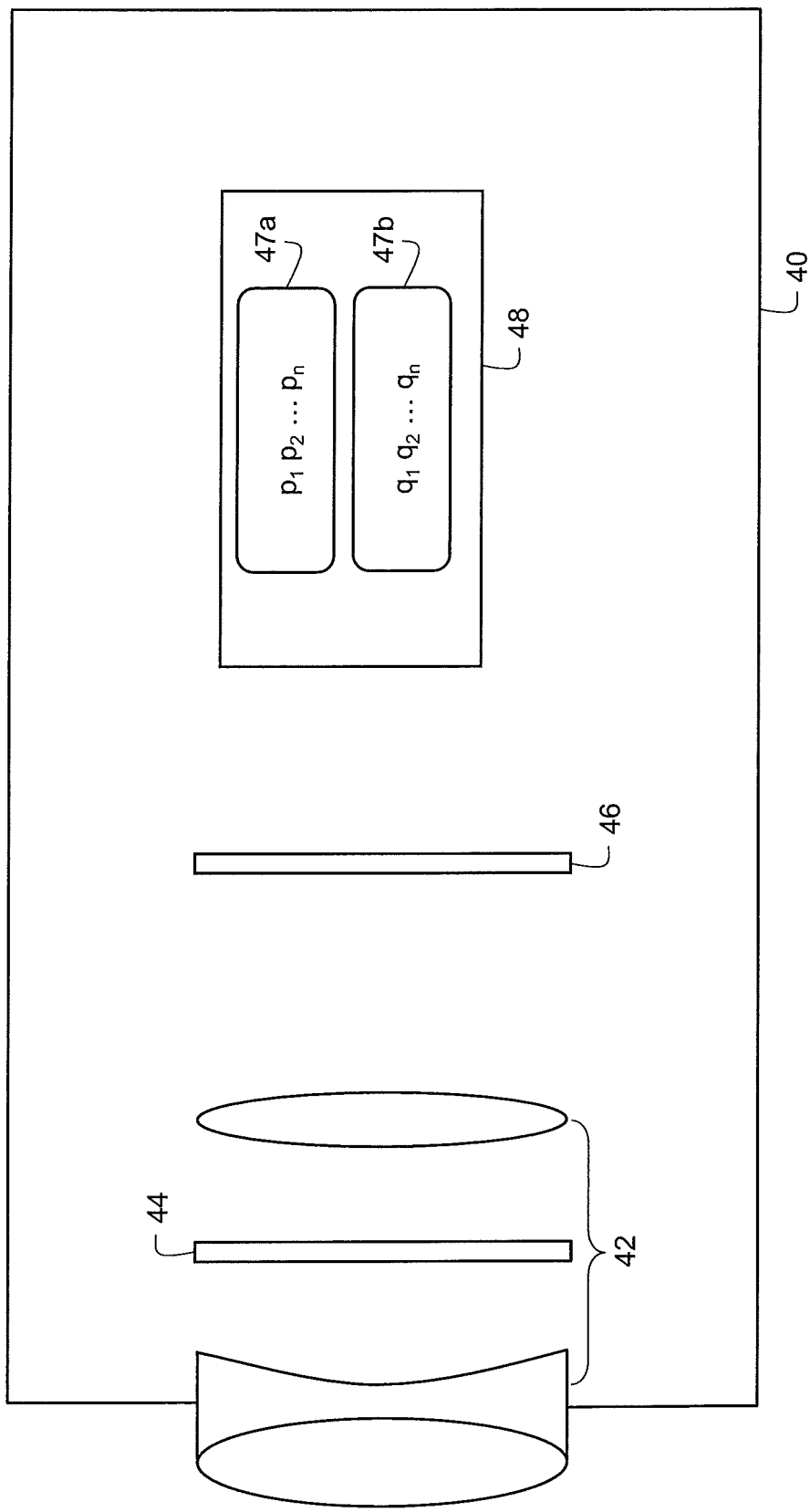
FIG. 4 is a schematic of a capture device according to one embodiment of the present invention.
Figure 5:
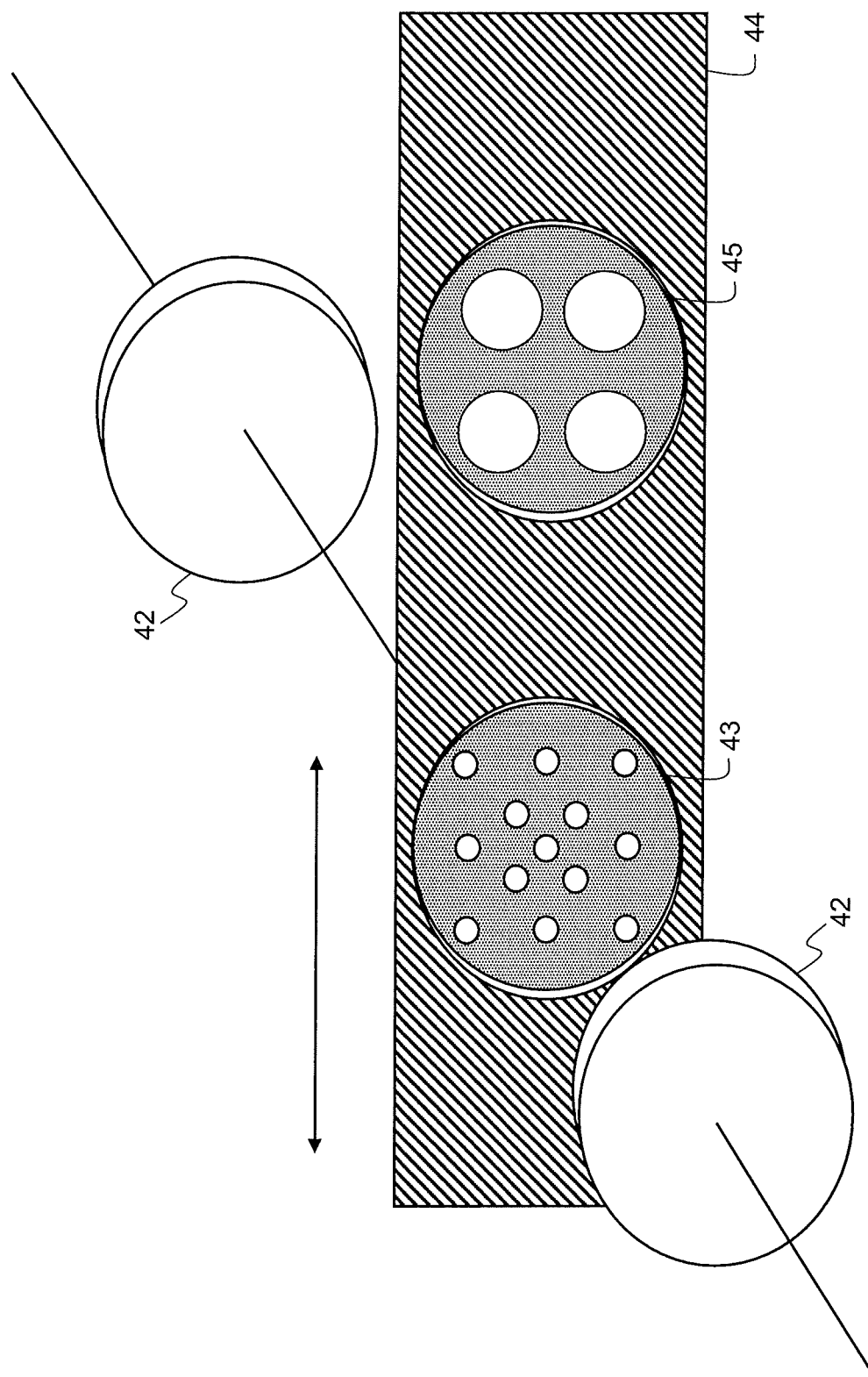
FIG. 5 is a schematic of an optical system with two coded apertures according to one embodiment of the present invention.

An image capture device includes one or more image capture devices that implement the methods of the various embodiments of the present invention, including the example image capture devices described herein. The phrases "image capture device" or "capture device" are intended to include any device including a lens which forms a focused image of a scene at an image plane, wherein an electronic image sensor is located at the image plane for the purposes of recording and digitizing the image, and which further includes a coded aperture or mask located between the scene or object plane and the image plane. These include a digital camera, cellular phone, digital video camera, surveillance camera, web camera, television camera, multimedia device, or any other device for recording images. FIG. 4 shows a side view schematic of one such capture device according to one embodiment of the present invention. The capture device 40 includes a lens 42, shown here as a compound lens composed of multiple elements, a coded aperture plate 44, and an electronic sensor array 46. Preferably, the coded aperture mounting plate 44 is located at the aperture stop of the optical system, or one of the images of the aperture stop, which are known in the art as the entrance and exit pupils. This can necessitate placement of the coded aperture in between elements of a compound lens 42, as illustrated in FIG. 3, depending on the location of the aperture stop. FIG. 5 shows an expanded view of the compound lens 42 and the coded aperture mounting plate 44, according to one embodiment of the present invention. As shown in FIG. 5, two coded apertures 43 and 45 are inserted into circular openings in the plate, which is translated in the horizontal direction to permit placement of either aperture 43 or 45 into the optical path. It will be appreciated that other mounting methods are possible within the scope of the invention. For example, the apertures are inserted into a circular mounting plate so that the apertures are rotated into position. It will also be appreciated that the aperture mounting plate is fabricated from many different materials, including, but not limited to metal, plastic or cardboard. The coded apertures 43 and 45 are of the light absorbing type, so as to alter only the amplitude distribution across the optical wavefronts incident upon it, or the phase type, so as to alter only the phase delay across the optical wavefronts incident upon it, or of mixed type, so as to alter both the amplitude and phase.

Returning to FIG. 3, the step of storing in a memory 60 a set of blur parameters refers to storing a representation of the psf of the image capture device for a series of object distances and defocus distances. Storing the blur parameters includes storing a digitized representation of the psf, specified by discrete code values in a two dimensional matrix. It also includes storing mathematical parameters derived from a regression or fitting function that has been applied to the psf data, such that the psf values for a given (x,y,z) location are readily computed from the parameters and the known regression or fitting function. Such memory can include computer disk, ROM, RAM or any other electronic memory known in the art. Such memory can reside inside the camera, or in a computer or other device electronically linked to the camera. In the embodiment shown in FIG. 4, the memory 48 storing blur parameters 47a, i.e. $[p_1, p_2, \ldots p_n]$, for the first coded aperture and blur parameters 47b, i.e. $[q_1, w_2, \ldots q_n]$, for the second coded aperture is located inside the camera 40.

Figure 6:
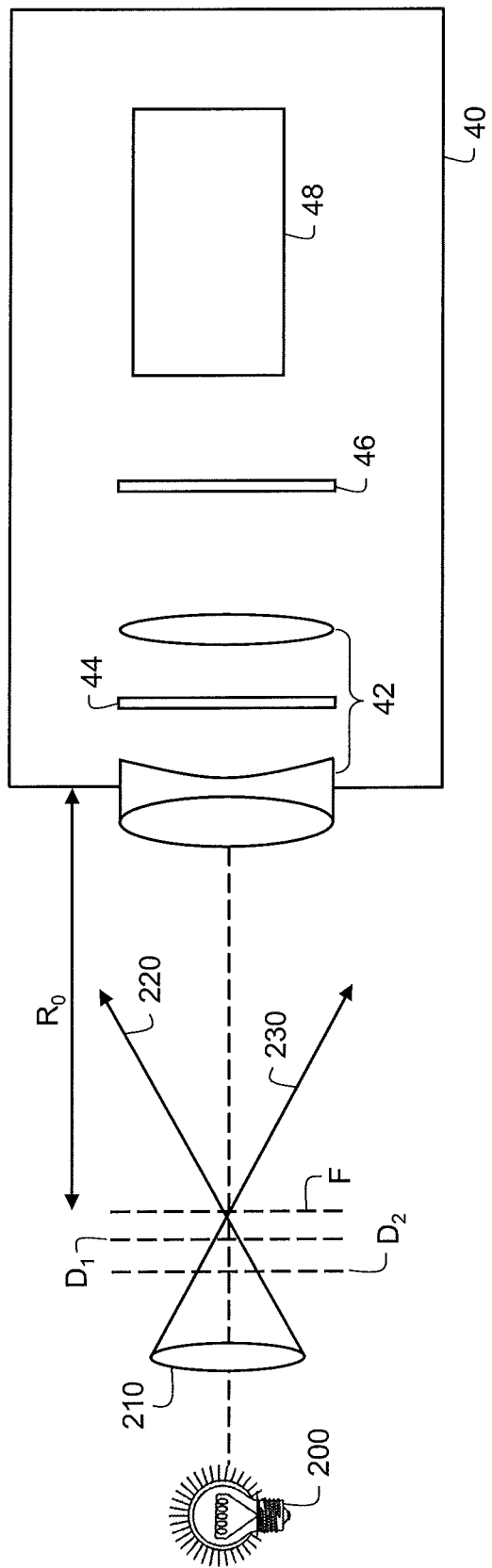
FIG. 6 is a schematic of a laboratory setup for obtaining blur parameters for one object distance and a series of defocus distances according to one embodiment of the present invention.

FIG. 6 is a schematic of a laboratory setup for obtaining blur parameters for one object distance and a series of defocus distances in accord with the present invention. A simulated point source including a light source 200 is focused by condenser optics 210 at a point on the optical axis intersected by the focal plane F, which is also the plane of focus of the camera 40, located at object distance $R_0$ from the camera. The light rays 220 and 230 passing through the point of focus appear to emanate from a point source located on the optical axis at distance $R_0$ from the camera. With the first coded aperture in place in the mounting plate 44, an image of this light is captured by the camera 40, thus recording the camera psf of the camera 40 at object distance $R_0$. The defocused psf for objects at other distances from the camera 40 is captured by moving the source 200 and condenser lens 210 (in this example, to the left) together so as to move the location of the effective point source to other planes, for example $D_1$ and $D_2$, while maintaining the camera 40 focus position at plane F. The distances (or range data) from the camera 40 to planes F, $D_1$ and $D_2$ are then recorded along with the psf images to complete the first set of range calibration data. The process is repeated with the second coded aperture in place in the mounting plate 44 to complete the second set of range calibration data Returning to FIG. 3, the step of capturing an image of the scene 70 includes capturing two images of the scene, with first and second coded apertures, or two digital image sequences, also known in the art as motion or video sequences, one image sequence for each of the first and second coded apertures. In this way the method includes the ability to identify range information for one or more moving objects in a scene. This is accomplished by determining range information 90 for each image in the sequence, or by determining range information for some subset of images in the sequence. In some embodiments, a subset of images in the sequence is used to determine range information for one or more moving objects in the scene, as long as the time interval between the images chosen is sufficiently small to resolve significant changes in the depth or z-direction. That is, this will be a function of the objects' speed in the z-direction and the original image capture interval, or frame rate. In other embodiments, the determination of range information for one or more moving objects in the scene is used to identify stationary and moving objects in the scene. This is especially advantageous if the moving objects have a z-component to their motion vector, i.e. their depth changes with time, or image frame. Stationary objects are identified as those objects for which the computed range values are unchanged with time after accounting for motion of the camera, whereas moving objects have range values that can change with time. In yet another embodiment, the range information associated with moving objects is used by an image capture device to track such objects.

Figure 7:
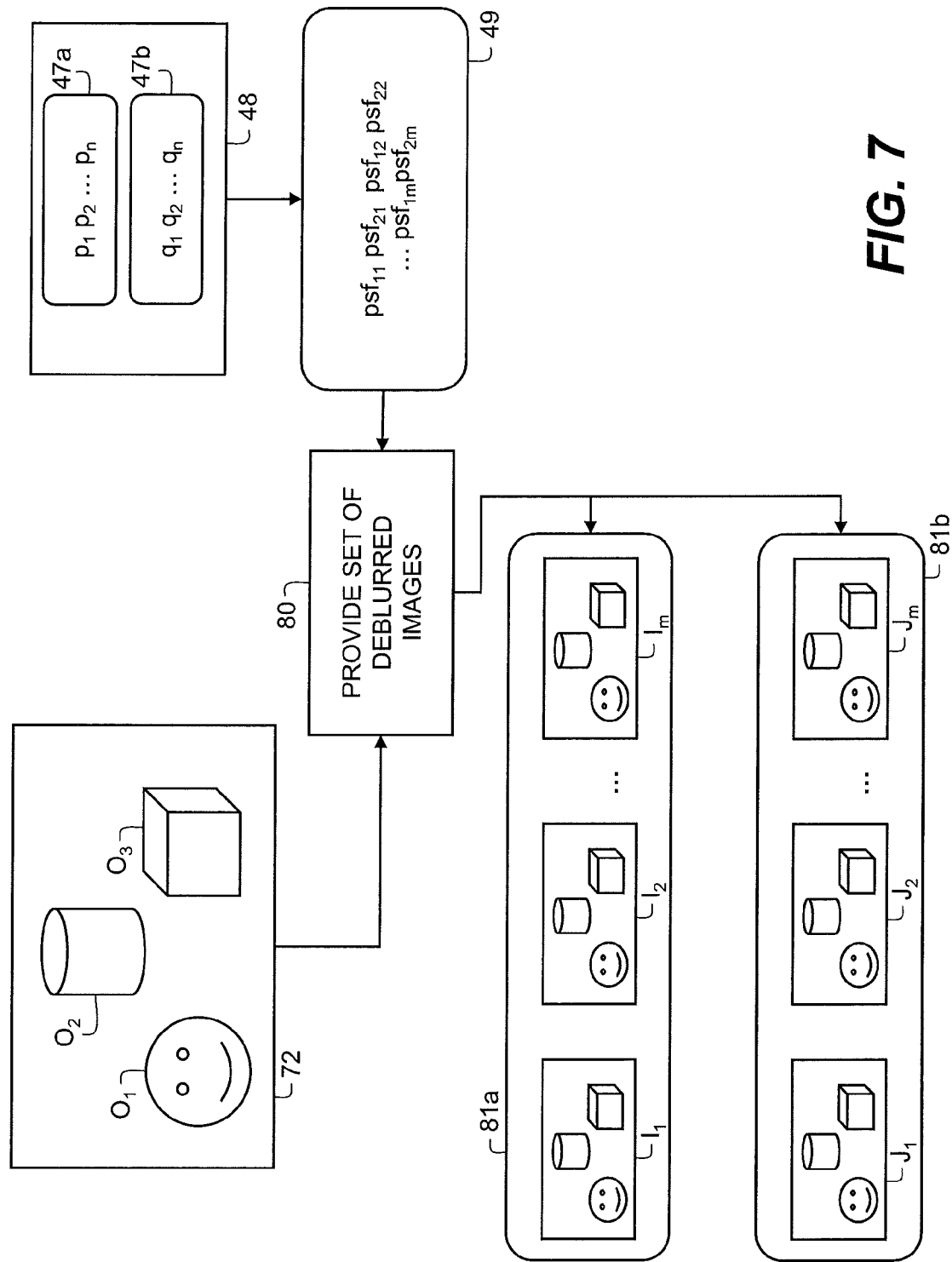
FIG. 7 is a process diagram illustrating how a captured image and blur parameters are used to provide a set of deblurred images, according to one embodiment of the present invention.

FIG. 7 shows a process diagram in which a captured image 72 and blur parameters $[p_1, p_2, \ldots p_n]$ 47a and $[q_1, q_2, \ldots q_n]$ 47b stored in a memory 48 are used to provide 80 a set of deblurred images 81a and 81b. The blur parameters are a set of two dimensional matrices that approximate the psf of the image capture device 40 for the distance at which the image was captured, and a series of defocus distances covering the range of objects in the scene. Alternatively, the blur parameters are mathematical parameters from a regression or fitting function as described above. In either case, a digital representation of the point spread functions 49 that span the range of object distances of interest in the object space are computed from the blur parameters, represented in FIG. 7 as the set $[psf_{11}, psf_{21}, \ldots psf_{1m} psf_{2m}]$. Here the n,m subscripts refer to the $m^{th}$ range value for coded aperture n=1 or n=2. In the preferred embodiment, there is a one-to-one correspondence between the blur parameters 47a, 47b and the set of digitally represented psfs 49. In some embodiments, there is not a one-to-one correspondence. In some embodiments, digitally represented psfs at defocus distances for which blur parameter data has not been recorded is computed by interpolating or extrapolating blur parameter data from defocus distances for which blur parameter data is available. In the embodiment illustrated here, the sets of range values associated with the blur parameter data for the two coded apertures are identical. In other embodiments, blur parameter data is obtained at sets of range values for the two coded apertures that are partially coincident, overlapping but not coincident (i.e. interleaved), or covering disjoint intervals with different minimum and maximum range values.

Returning to FIG. 7, the digitally represented psfs 49 are used in a deconvolution operation to provide two sets of deblurred images, the first 81a, resulting from the first set of coded aperture psf data, and the second 81b, resulting from the second set of coded aperture psf data. In the embodiment shown, the captured image 72 which contains scene objects $O_1$, $O_2$ and $O_3$, is deconvolved 2m times, once for each of the 2m elements in the set 49, to create a set of 2m deblurred images, 81a and 81b. The deblurred image sets 81a and 81b, whose elements are denoted $[I_1, I_2, \ldots I_m]$ and $[J_1, J_2, \ldots J_m]$, are then further processed with reference to the original captured image 72, to determine the range information for the scene objects $O_1$, $O_2$ and $O_3$.

Figure 8:
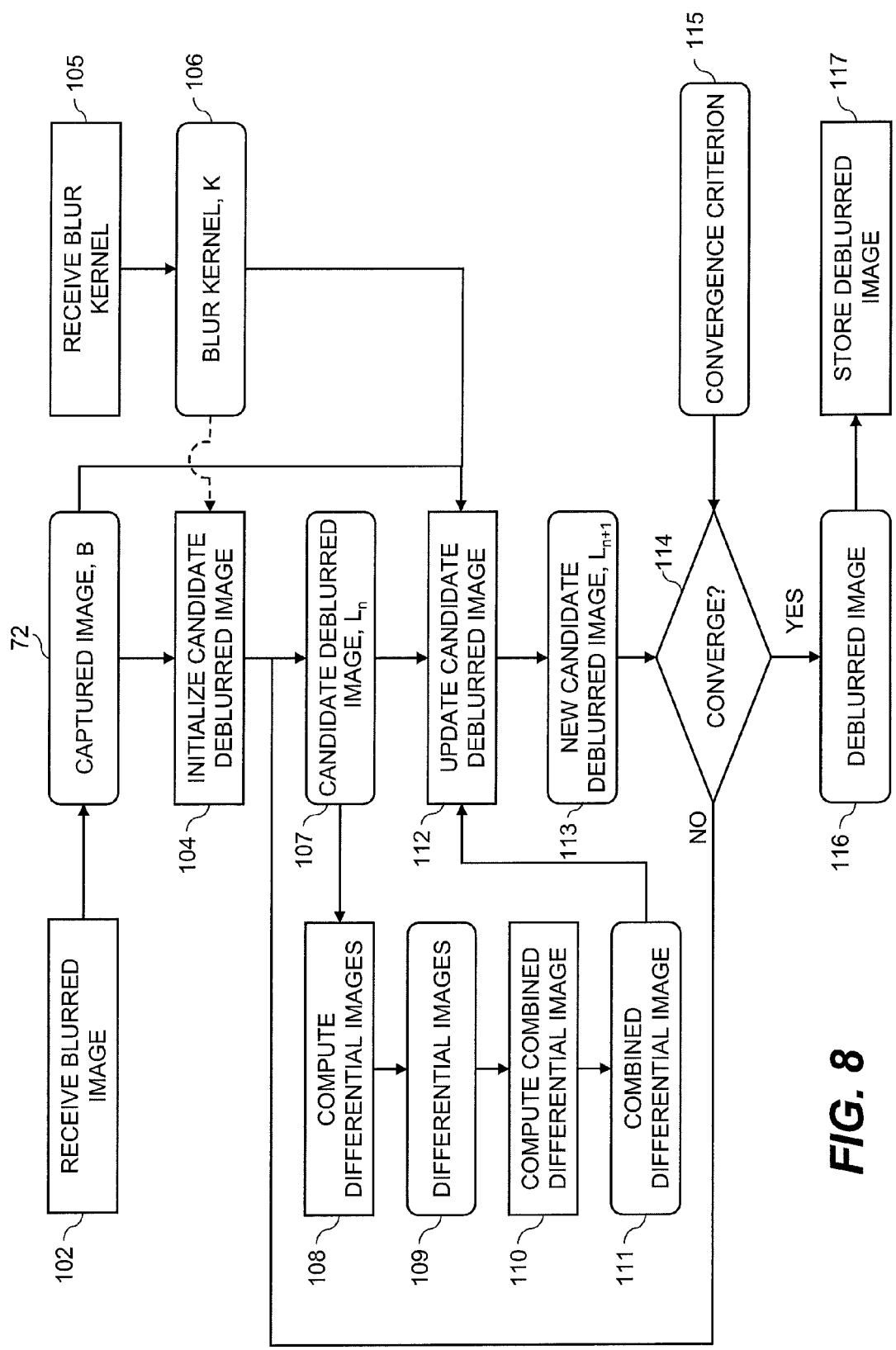
FIG. 8 is a process diagram illustrating the deblurring of a single image according to one embodiment of the present invention.

The step of providing a set of deblurred images 80 will now be described in further detail with reference to FIG. 8, which illustrates the process of deblurring a single image using a single element of the set 49 of psfs in accordance with the present invention. As is known in the art, the image to be deblurred is referred to as the blurred image, and the psf representing the blurring effects of the camera system is referred to as the blur kernel. A receive blurred image step 102 is used to receive the captured image 72 of the scene. Next a receive blur kernel step 105 is used to receive a blur kernel 106 which has been chosen from the set of psfs 49. The blur kernel 106 is a convolution kernel that is applied to a sharp image of the scene to produce an image having sharpness characteristics approximately equal to one or more objects within the captured image 72 of the scene.

Next, an initialize candidate deblurred image step 104 is used to initialize a candidate deblurred image 107 using the captured image 72. In a preferred embodiment of the present invention, the candidate deblurred image 107 is initialized by simply setting it equal to the captured image 72. Optionally, any deconvolution algorithm known to those in the art is used to process the captured image 72 using the blur kernel 106, and the candidate deblurred image 107 is then initialized by setting it equal to the processed image. Examples of such deconvolution algorithms would include conventional frequency domain filtering algorithms such as the well-known Richardson-Lucy (RL) deconvolution method described in the background section. In other embodiments, where the captured image 72 is part of an image sequence, a difference image is computed between the current and previous image in the image sequence, and the candidate deblurred image is initialized with reference to this difference image. For example, if the difference between successive images in the sequence is currently small, the candidate deblurred image would not be reinitialized from its previous state, saving processing time. The reinitialization is saved until a significant difference in the sequence is detected. In other embodiments, only selected regions of the candidate deblurred image are reinitialized, if significant changes in the sequence are detected in only selected regions. In yet another embodiment, the range information is recomputed for only selected regions or objects in the scene where a significant difference in the sequence is detected, thus saving processing time.

Next, a compute differential images step 108 is used to determine a plurality of differential images 109. The differential images 109 can include differential images computed by calculating numerical derivatives in different directions (e.g., x and y) and with different distance intervals (e.g., Δx=1, 2, 3). A compute combined differential image step 110 is used to form a combined differential image 111 by combining the differential images 109.

Next, an update candidate deblurred image step 112 is used to compute a new candidate deblurred image 113 responsive to the captured image 72, the blur kernel 106, the candidate deblurred image 107, and the combined differential image 111. As will be described in more detail later, in a preferred embodiment of the present invention, the update candidate deblurred image step 112 employs a Bayesian inference method using Maximum-A-Posterior (MAP) estimation.

Next, a convergence test 114 is used to determine whether the deblurring algorithm has converged by applying a convergence criterion 115. The convergence criterion 115 is specified in any appropriate way known to those skilled in the art. In a preferred embodiment of the present invention, the convergence criterion 115 specifies that the algorithm is terminated if the mean square difference between the new candidate deblurred image 113 and the candidate deblurred image 107 is less than a predetermined threshold. Alternate forms of convergence criteria are well known to those skilled in the art. As an example, the convergence criterion 115 is satisfied when the algorithm is repeated for a predetermined number of iterations. Alternatively, the convergence criterion 115 can specify that the algorithm is terminated if the mean square difference between the new candidate deblurred image 113 and the candidate deblurred image 107 is less than a predetermined threshold, but is terminated after the algorithm is repeated for a predetermined number of iterations even if the mean square difference condition is not satisfied.

If the convergence criterion 115 has not been satisfied, the candidate deblurred image 107 is updated to be equal to the new candidate deblurred image 113. If the convergence criterion 115 has been satisfied, a deblurred image 116 is set to be equal to the new candidate deblurred image 113. A store deblurred image step 117 is then used to store the resulting deblurred image 116 in a processor-accessible memory. The processor-accessible memory is any type of digital storage such as RAM or a hard disk.

In a preferred embodiment of the present invention, the deblurred image 116 is determined using a Bayesian inference method with Maximum-A-Posterior (MAP) estimation. Using the method, the deblurred image 116 is determined by defining an energy function of the form:

$$E(L)=(L \otimes K-B)^2+\lambda D(L) \qquad (6)$$

where L is the deblurred image 116, K is the blur kernel 106, B is the blurred image (i.e. captured image 72), $\otimes$ is the convolution operator, D(L) is the combined differential image 111 and λ is a weighting coefficient In a preferred embodiment of the present invention the combined differential image 111 is computed using the following equation:

$$D(L) = \sum_j w_j (\partial_j L)^2 \qquad (7)$$

where j is an index value, $\partial_j$ is a differential operator corresponding to the $j^{th}$ index, $w_j$ is a pixel-dependent weighting factor which will be described in more detail later.

Figure 9:
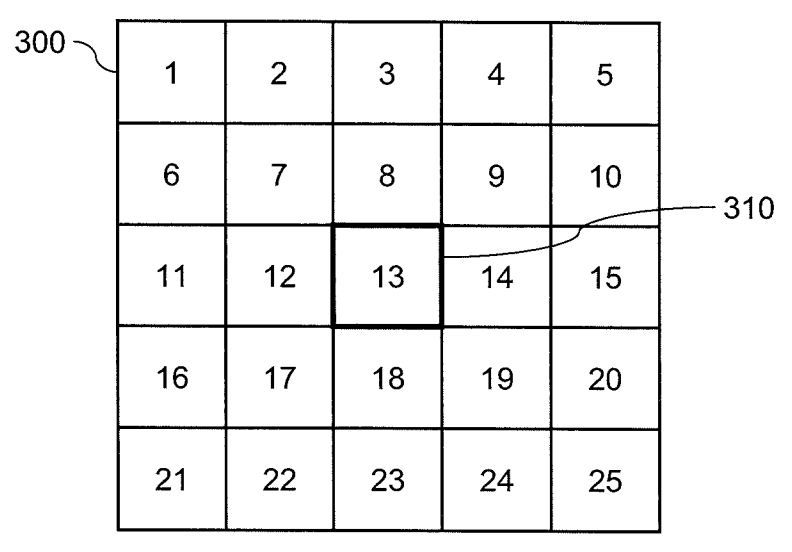

The index j is used to identify a neighboring pixel for the purpose of calculating a difference value. In a preferred embodiment of the present invention difference values are calculated for a 5×5 window of pixels centered on a particular pixel. FIG. 9 shows an array of indices 300 centered on a current pixel location 310. The numbers shown in the array of indices 300 are the indices j. For example, an index value of j=6 corresponds to a top pixel that is 1 row above and 2 columns to the left of the current pixel location 310.

The differential operator $\partial_j$ determines a difference between the pixel value for the current pixel, and the pixel value located at the relative position specified by the index j. For example, $\partial_6 S$ would correspond to a differential image determined by taking the difference between each pixel in the deblurred image L with a corresponding pixel that is 1 row above and 2 columns to the left. In equation form this would be given by:

$$\partial_j L = L(x,y) - L(x-\Delta x_j, y-\Delta y_j) \qquad (8)$$

where $\Delta x_j$ and $\Delta y_j$ are the column and row offsets corresponding to the $j^{th}$ index, respectively. It will generally be desirable for the set of differential images $\partial_j L$ to include one or more horizontal differential images representing differences between neighboring pixels in the horizontal direction and one or more vertical differential images representing differences between neighboring pixels in the vertical direction, as well as one or more diagonal differential images representing differences between neighboring pixels in a diagonal direction.

In a preferred embodiment of the present invention, the pixel-dependent weighting factor $w_j$ is determined using the following equation:

$$w_j = (w_d)_j (w_p)_j \qquad (9)$$

where $(w_d)_j$ is a distance weighting factor for the $j^{th}$ differential image, and $(w_p)_j$ is a pixel-dependent weighting factor for the $j^{th}$ differential image.

The distance weighting factor $(w_d)_j$ weights each differential image depending on the distance between the pixels being differenced:

$$(w_d)_j = G(d) \qquad (10)$$

where $d=\sqrt{\Delta x_j^2 + \Delta y_j^2}$ is the distance between the pixels being differenced, and G(•) is weighting function. In a preferred embodiment, the weighting function G(•) falls off as a Gaussian function so that differential images with larger distances are weighted less than differential images with smaller distances.

The pixel-dependent weighting factor $(w_p)_j$ weights the pixels in each differential image depending on their magnitude. For reasons discussed in the aforementioned article "Image and depth from a conventional camera with a coded aperture" by Levin et al., it is desirable for the pixel-dependent weighting factor w to be determined using the equation:

$$(w_p)_j = |\partial_j L|^{\alpha-2} \bullet \qquad (11)$$

where |•| is the absolute value operator and α is a constant (e.g., 0.8). During the optimization process, the set of differential images $\partial_j L$ is calculated for each iteration using the estimate of L determined for the previous iteration.

The first term in the energy function given in Eq. (6) is an image fidelity term. In the nomenclature of Bayesian inference, it is often referred to as a "likelihood" term. It is seen that this term will be small when there is a small difference between the blurred image (i. e. captured image 72) (B) and a blurred version of the candidate deblurred image (L) which as been convolved with the blur kernel 106 (K).

The second term in the energy function given in Eq. (6) is an image differential term. This term is often referred to as an "image prior." The second term will have low energy when the magnitude of the combined differential image 111 is small. This reflects the fact that a sharper image will generally have more pixels with low gradient values as the width of blurred edges is decreased.

The update candidate deblurred image step 112 computes the new candidate deblurred image 113 by reducing the energy function given in Eq. (8) using optimization methods that are well known to those skilled in the art. In a preferred embodiment of the present invention, the optimization problem is formulated as a PDE given by:

$$\frac{\partial E(L)}{\partial L} = 0. \qquad (12)$$

which is solved using conventional PDE solvers. In a preferred embodiment of the present invention, a PDE solver is used where the PDE is converted to a linear equation form that is solved using a conventional linear equation solver, such as a conjugate gradient algorithm. For more details on solving PDE solvers, refer to the aforementioned article by Levin et al. It should be noted that even though the combined differential image 111 is a function of the deblurred image L, it is held constant during the process of computing the new candidate deblurred image 113. Once the new candidate deblurred image 113 has been determined, it is used in the next iteration to determine an updated combined differential image 111.

Figure 10:
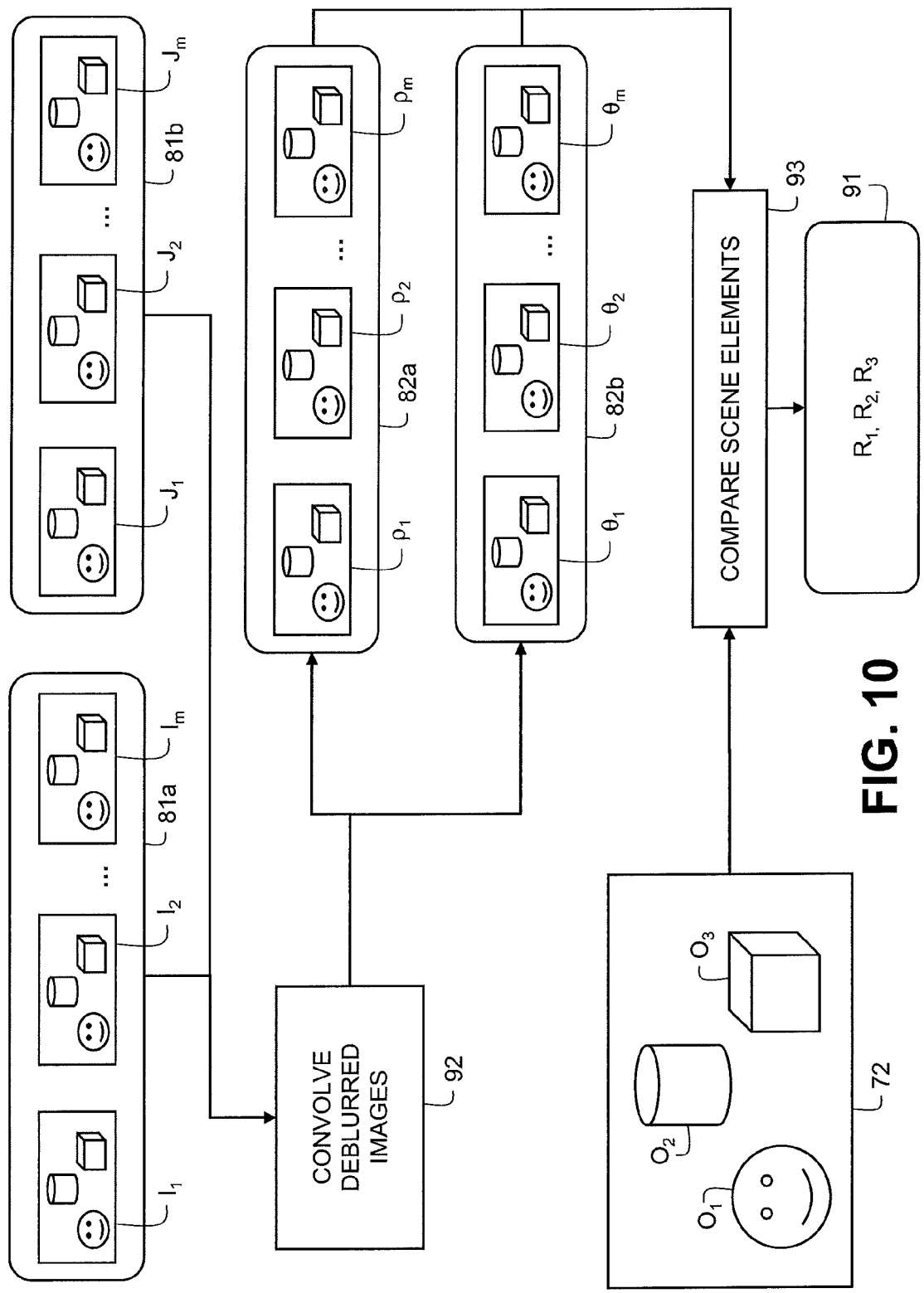
FIG. 10 is a process diagram illustrating a deblurred image set processed to determine the range information for objects in a scene, according to one embodiment of the present invention.

FIG. 10 shows a process diagram in which the deblurred image sets 81a, 81b are processed to determine the range information 91 for the objects in the scene, in accord with an embodiment of the present invention. In this embodiment, each element of the deblurred image sets 81a, 81b is digitally convolved 92, using algorithms known in the art, with its corresponding element from the set of digitally represented psfs 49 in step 80. The result is two sets of reconstructed images 82a, 82b, whose elements are denoted $[\rho_1, \rho_2, \ldots \rho_m]$ and $[\theta_1, \theta^2, \ldots \theta_m]$. In theory, each reconstructed image should be an exact match for the original captured image 72, since the convolution operation is the inverse of the deblurring, or deconvolution operation that was performed earlier. However, because the deconvolution operation is imperfect, no elements of the resulting reconstructed image set 82a, 82b are a perfect match for the captured image 72. Scene elements reconstruct with higher fidelity when processed with psfs corresponding to a distance that more closely matches the distance of the scene element relative to the plane of camera focus, whereas scene elements processed with psfs corresponding to distances that differ from the distance of the scene element relative to the plane of camera focus exhibit poor fidelity and noticeable artifacts. With reference to FIG. 10, by comparing 93 the reconstructed image sets 82a, 82b with the scene elements in the captured image 72, range values 91 are assigned by finding the closest matches between the scene elements in the captured image 72 and the reconstructed versions of those elements in the reconstructed image sets 82a, 82b. For example, scene elements $O_1, O_2$, and $O_3$ in the captured image 72 are compared 93 to their reconstructed versions in each element $[\rho_1, \rho_2, \ldots \rho_m]$ and $[\theta_1, \theta_2, \ldots \theta_m]$ of the reconstructed image sets 82a, 82b, and assigned range values 91 of $R_1, R_2$, and $R_3$ that correspond to the psfs that yield the closest matches.

Figure 11:
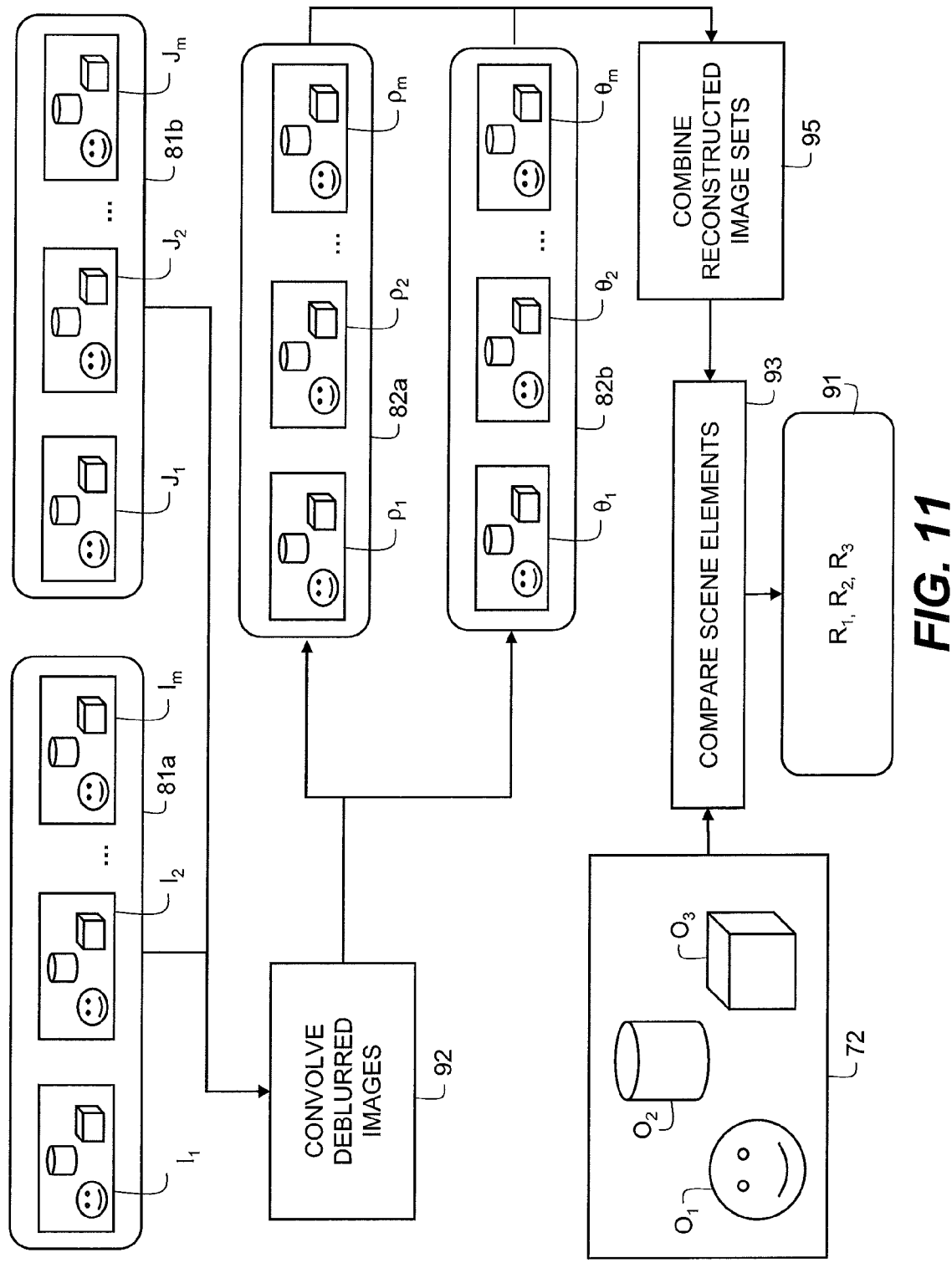
FIG. 11 is a process diagram illustrating a deblurred image set processed to determine the range information for objects in a scene, according to an alternate embodiment of the present invention.

In a preferred embodiment of the present invention, the deblurred and reconstructed image sets 82a, 82b are combined before comparison with the captured image 72 and assignment of range values. FIG. 11 shows this process, wherein the reconstructed image sets 82a, 82b are combined 95, followed by comparison 93 of the scene elements in each image set with those of the captured image 72. Combining the reconstructed image sets 82a, 82b resulting from the deblurred image sets 81a, 81b is defined as the creation of a new image set in which each element is a weighted sum of the corresponding elements of the original sets 82a, 82b, i.e. those set elements corresponding to the same range value. This is written mathematically as:

$$\hat{i}_{comb} = \{w_1\rho_1(x,y) + w_2\theta_1(x,y);\ w_1\rho_2(x,y) + w_2\theta_2(x,y);\ \ldots \\ w_1\rho_m(x,y) + w_2\theta_m(x,y)\} \qquad (13)$$

where $w_k$, k=1,2 are the weighting factors and $w_1+w_2=1$. The advantage of this method is that the two coded apertures are made to have different spatial frequency responses, and therefore do not produce the same reconstruction artifacts, which are therefore at least partially averaged out in the combination step 95, as defined in Eq. (13). This leads to a more robust determination of the range of each scene element in step 93. In other arrangements, the weighting factors $w_k$, shown in Eq. (13) to be the same for each range value, vary between range values, subject to the constraint that $w_1+w_2=1$ for each range value. The weighting factors $w_k$ are predetermined to produce a combined image set with a minimum of reconstruction artifacts, and depend on the choice of coded apertures. This is accomplished through experimentation, or through optimization techniques known in the art.

In another arrangement, the reconstructed image sets 82a, 82b are combined in the Fourier domain where the inverse Fourier transform is taken. In yet another arrangement, the combination is performed in the Fourier domain using a spatial frequency dependent weighting criterion. This is computed using an expression such as:

$$\hat{i}_{comb} = \left\{ \begin{array}{l} w_1(v_x, v_y)\hat{\rho}_1(v_x, v_y) + w_2(v_x, v_y)\hat{\theta}_1(v_x, v_y); \\ w_1(v_x, v_y)\hat{\rho}_2(v_x, v_y) + w_2(v_x, v_y)\hat{\theta}_2(v_x, v_y); \\ \ldots w_1(v_x, v_y)\hat{\rho}_m(v_x, v_y) + w_2(v_x, v_y)\hat{\theta}_m(v_x, v_y) \end{array} \right\} \qquad (14)$$

where $\hat{\rho}(v_x,v_y)$ and $\hat{\theta}(v_x,v_y)$ denote the Fourier transforms of $\rho(x,y)$ and $\theta(x,y)$, respectively. The advantage of this method is that the two sets of coded aperture responses are weighted to have the most influence at spatial frequencies where each aperture has an effective signal-to-noise ratio, such as away from zeroes in its Fourier response, which reduces reconstruction artifacts and produces more robust range estimates. In this arrangement, the weighting functions $w_1(v_x,v_y)$ and $w_2(v_x,v_y)$ obey the constraint $w_1(0,0)+w_2(0,0)=1$ for each range value, in order to avoid changes in the overall brightness of the images. Once again, the weighting factors $w_1(v_x, v_y)$ and $w_2(v_x,v_y)$ are predetermined to produce a combined image set with a minimum of reconstruction artifacts, and depend on the choice of coded apertures. This is accomplished through experimentation, or through optimization techniques known in the art. In this arrangement, the optimization should take into account the spatial frequency dependence of the weighting factors.

The deblurred image sets 81a, 81b are intentionally limited by using a subset of blur parameters from the stored set. This is done for a variety of reasons, such as reducing the processing time to arrive at the range values 91, or to take advantage of other information from the camera 40 indicating that the full range of blur parameters is not necessary. The set of blur parameters used (and hence the deblurred image sets 81a, 81b created) are limited in increment (i.e. subsampled) or extent (i.e. restricted in range). Returning to FIG. 10, the subset of blur parameters chosen need not be identical for the two coded apertures. If not identical, this implies that there will not be a one-to-one correspondence between images in the reconstructed image sets 82a and 82b for all or any range values. In some arrangements, the two coded apertures are used to provide range estimates at range values which are interleaved. In other arrangements, the two coded apertures are used to provide range estimates at range values over disjoint intervals. If a digital image sequence is processed, the set of blur parameters used are the same, or different for each image in the sequence.

Alternatively, instead of subsetting or subsampling the blur parameters from the stored set, reduced sets of deblurred images are created by combining images corresponding to range values within selected range intervals. This might be done to improve the precision of depth estimates in a highly textured or highly complex scene which is difficult to segment. For example, let $z_m$, where $m=1, 2, \ldots M$ denote the set of range values at which the blur parameters $[p_1, p_2, \ldots p_m]$ and $[q_1, q_2, \ldots q_m]$ have been measured. Let $\hat{i}_m(x,y)$ denote the deblurred image corresponding to range value m and blur parameters $p_m$, and let $\hat{j}_m(x,y)$ denote the deblurred image corresponding to range value m and blur parameters $q_m$. Further, let $\hat{I}_m(v_x,v_y)$ and $\hat{J}_m(v_x,v_y)$ denote their Fourier transforms. If the range values are divided into M equal groups or intervals, each containing M range values, reduced deblurred image sets is defined as follows:

$$\hat{i}_{red} = \left\{ \begin{array}{l} \frac{1}{N}\sum_{m=1}^{N}\hat{i}_m(x,y); \frac{1}{N}\sum_{m=N+1}^{2N}\hat{i}_m(x,y); \\ \frac{1}{N}\sum_{m=2N+1}^{3N}\hat{i}_m(x,y); \ldots \frac{1}{N}\sum_{m=(N/M)-N}^{N/M}\hat{i}_m(x,y); \end{array} \right\} \quad (15)$$

$$\hat{j}_{red} = \left\{ \begin{array}{l} \frac{1}{N}\sum_{m=1}^{N}\hat{j}_m(x,y); \frac{1}{N}\sum_{m=N+1}^{2N}\hat{j}_m(x,y); \\ \frac{1}{N}\sum_{m=2N+1}^{3N}\hat{j}_m(x,y); \ldots \frac{1}{N}\sum_{m=(N/M)-N}^{N/M}\hat{j}_m(x,y); \end{array} \right\} \quad (16)$$

In other arrangements, the range values are divided into M unequal groups, whereas in other arrangements a different number of groups is associated with each coded aperture. In yet another arrangement, a reduced blurred image set is defined using a spatial frequency dependent weighting criterion via the following equation:

$$\hat{I}_{red} = \left\{ \begin{array}{l} \frac{1}{N}\sum_{m=1}^{N}w(v_x,v_y)\hat{I}_m(v_x,v_y); \frac{1}{N}\sum_{m=N+1}^{2N}w(v_x,v_y)\hat{I}_m(v_x,v_y); \\ \ldots \frac{1}{N}\sum_{m=(N/M)-N}^{N/M}w(v_x,v_y)\hat{I}_m(v_x,v_y); \end{array} \right\} \quad (17)$$

$$\hat{J}_{red} = \left\{ \begin{array}{l} \frac{1}{N}\sum_{m=1}^{N}w(v_x,v_y)\hat{J}_m(v_x,v_y); \frac{1}{N}\sum_{m=N+1}^{2N}w(v_x,v_y)\hat{J}_m(v_x,v_y); \\ \ldots \frac{1}{N}\sum_{m=(N/M)-N}^{N/M}w(v_x,v_y)\hat{J}_m(v_x,v_y); \end{array} \right\} \quad (18)$$

where $w(v_x,v_y)$ is a spatial frequency weighting function. Such a weighting function is useful, for example, in emphasizing spatial frequency intervals where the signal-to-noise ratio is most favorable, or where the spatial frequencies are most visible to the human observer. In some embodiments, the spatial frequency weighting function is the same for each of the M range intervals, however, in other embodiments the spatial frequency weighting function is different for some or all of the intervals. In other arrangements, the spatial frequency weighting function is different for the two coded apertures.

Figure 12:
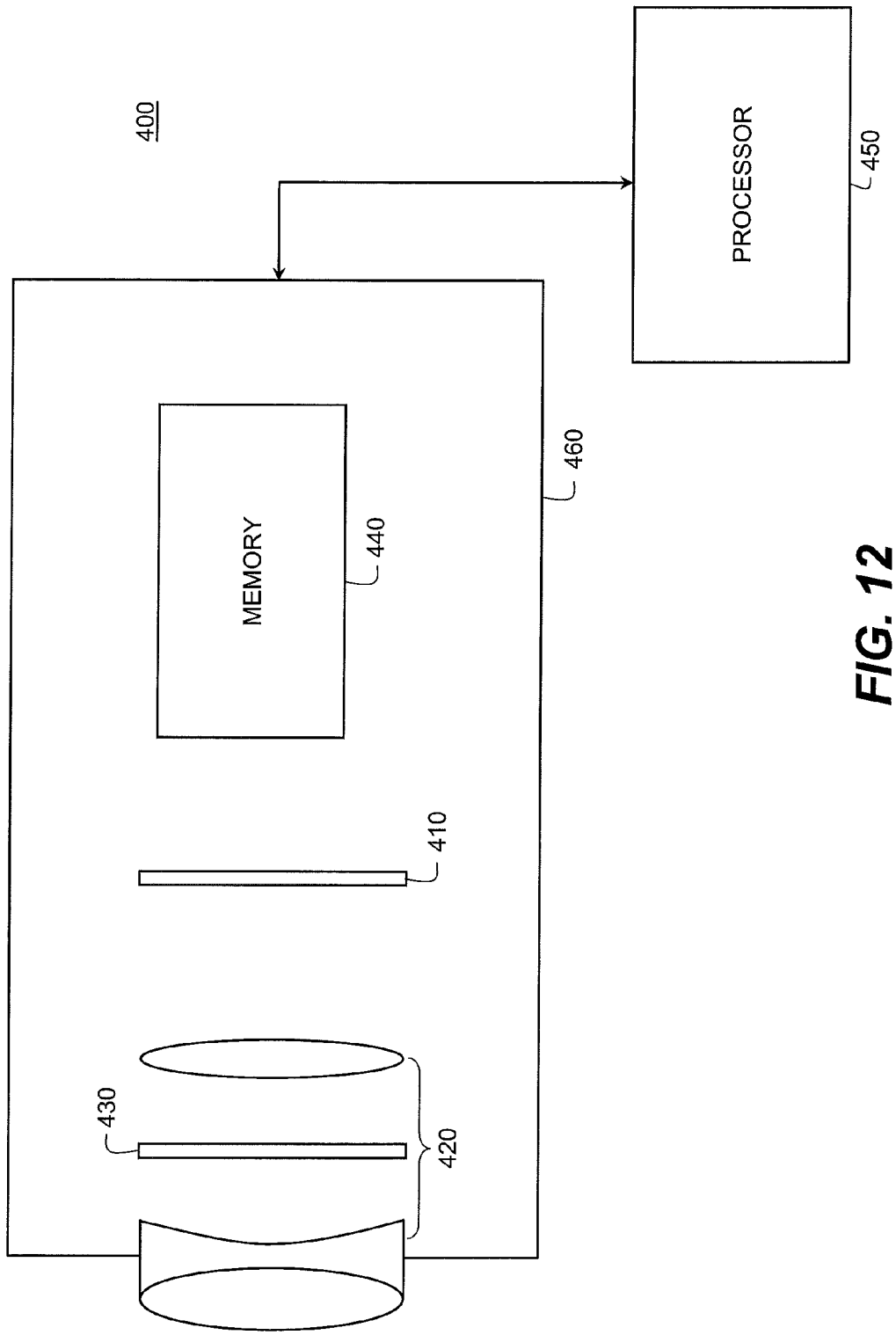
FIG. 12 is a schematic of a digital camera system according to one embodiment of the present invention.

FIG. 12 is a schematic of a digital camera system 400 in accordance with the present invention. The digital camera system 400 includes an image sensor 410 for capturing one or more images of a scene, a lens 420 for imaging the scene onto the sensor, a coded aperture plate 430 on which is mounted at least two coded apertures, and a processor-accessible memory 440 for storing a set of blur parameters derived from range calibration data for each coded aperture, all inside an enclosure 460, and a data processing system 450 in communication with the other components, for providing a set of deblurred images using the captured images and each of the blur parameters from the stored set, and for using the set of deblurred images to determine the range information for the objects in the scene. The data processing system 450 is a programmable digital computer that executes the steps previously described for providing a set of deblurred images using captured images and each of the blur parameters from the stored set. In other arrangements, the data processing system 450 is inside the enclosure 460, in the form of a small dedicated processor.

The invention has been described in detail with particular reference to certain preferred embodiments thereof, but it will be understood that variations and modifications can be effected within the spirit and scope of the invention.

Parts List $s_1$ Distance
$s_2$ Distance
$s_1'$ Distance
$s_2'$ Image Distance
$P_1$ On-Axis Point
$P_2$ On-Axis Point
$P_1'$ Image Point
$P_2'$ Image Point
D Diameter
d Distance
F Focal Plane
$R_0$ Object Distance
$D_1$ Planes
$D_2$ Planes
$O_1, O_2, O_3$ Scene Elements ρ₁, ρ₂, ... ρ_m Element
θ₁, θ₂, ... θ_m Element
I₁, I₂, ... I_m Deblurred Image Set Element
J₁, J₂, ... J_m Deblurred Image Set Element
10 Lens
20 Axial ray
22 Axial ray
24 Axial ray
26 Axial ray
340 Lens
32 Coded aperture
34 Lens
40 Image capture device
42 Lens
43 Coded aperture
44 Mounting Plate
45 Coded aperture
46 Electronic sensor array
47a Blur parameters
47b Blur parameters
48 Memory
49 Digital representation of point spread functions
50 Provide image capture device step
60 Store blur parameters step
70 Capture image step
72 Captured image
80 Provide set of deblurred images step
81a Deblurred image set
81b Deblurred image set
82a Reconstructed image set
82b Reconstructed image set
90 Determine range information step
91 Range information
92 Convolve deblurred images step
93 Compare scene elements step
95 Combine reconstructed image sets step
102 Receive blurred image step
104 Initialize candidate deblurred image step
105 Receive blur kernel step
106 Blur kernel
107 Candidate deblurred image
108 Compute differential images step
109 Differential images
110 Compute combined differential image step
111 Combined differential image
112 Update candidate deblurred image step
113 New candidate deblurred image
114 Convergence test
115 Convergence criterion
116 Deblurred image
117 Store deblurred image step
200 Light source
210 Condenser optics
220 Light ray
230 Light ray
300 Array of indices
310 Current pixel location
400 Digital camera system
410 Image sensor
420 Lens
430 Coded aperture plate
440 Memory
450 Processor
460 Enclosure

The invention claimed is:

1. A method of using an image capture device to identify range information for objects in a scene, comprising:
   a) providing an image capture device having an image sensor, at least two coded apertures having different spatial frequency responses, and a lens;
   b) storing in a memory a set of blur parameters derived from range calibration data for each coded aperture;
   c) capturing images of the scene having a plurality of objects using each of the coded apertures;
   d) providing a set of deblurred images using the captured images from each coded aperture and each of the blur parameters from the stored set; and
   e) using the set of deblurred images to determine the range information for the objects in the scene.

2. The method of claim 1 wherein step d) includes for each deblurred image
   i) initializing a candidate deblurred image;
   ii) determining a plurality of differential images representing differences between neighboring pixels in the candidate deblurred including a range of at least 1 or more pixels in size and including vertical, horizontal and diagonal directions;
   iii) determining a combined differential image by combining the differential images;
   iv) updating the candidate deblurred image responsive to the captured image, the blur kernel, the candidate deblurred image and the combined differential image; and
   v) repeating steps i)-iv) until a convergence criterion is satisfied.

3. The method of claim 1, wherein step c) includes capturing first and second image sequences, corresponding to the first and second coded apertures, respectively.

4. The method of claim 3, wherein step e) includes determining range information for each image in the sequence.

5. The method of claim 4, wherein step e) includes determining range information for a subset of images in the sequence.

6. The method of claim 4, wherein the range information is used to identify stationary and moving objects in the scene.

7. The method of claim 6, wherein the range information is used by the image capture device to track moving objects.

8. The method of claim 3, wherein the step of initializing a candidate deblurred image includes:
   a) determining a difference image between the current and previous image in the image sequence; and
   b) initializing a candidate deblurred image responsive to the difference image.

9. The method of claim 8, wherein step e) includes determining range information for the objects in the scene, responsive to the difference image.

10. The method of claim 1, wherein step d) includes using a subset of blur parameters from the stored set.

11. The method of claim 1, wherein step b) includes using a set of blur parameters derived from calibration data at a set of range values, such that there is a set of blur parameters for each coded aperture at each corresponding range value.

12. The method of claim 1, wherein step b) includes storing a subset of blur parameters derived from calibration data at a set of range values, responsive to information provided by the image capture device.

13. The method of claim 1, wherein step e) includes combining the deblurred images according to a spatial-frequency dependent weighting criterion.

14. The method of claim 1, wherein step e) includes combining deblurred images resulting from blur parameters corresponding to each coded aperture within selected range intervals.

15. The method of claim 14, further including combining the deblurred images according to a spatial-frequency dependent weighting criterion.

16. A digital camera system comprising:
   a) an image sensor for capturing one or more images of a scene;
   b) a lens for imaging the scene onto the image sensor;
   c) at least two coded apertures having different spatial frequency responses;
   d) a processor-accessible memory for storing a set of blur parameters derived from range calibration data; and
   e) a data processing system for providing a set of deblurred images using captured images and each of the blur parameters from the stored set by,
      i) initializing a candidate deblurred image;
      ii) determining a plurality of differential images representing differences between neighboring pixels in the candidate deblurred image;
      iii) determining a combined differential image by combining the differential images;
      iv) updating the candidate deblurred image responsive to the captured image, the blur kernel, the candidate deblurred image and the combined differential image;
      v) repeating steps i)-iv) until a convergence criterion is satisfied; and
      vi) using the set of deblurred images to determine the range information for the objects in the scene.

17. A method of using an image capture device to identify range information for objects in a scene, comprising:
   a) providing an image capture device having an image sensor, at least two coded apertures having different spatial frequency responses, and a lens;
   b) storing in a memory a set of blur parameters derived from range calibration data for each coded aperture, using a set of blur parameters derived from calibration data at a set of range values, such that there is a set of blur parameters for each coded aperture at each corresponding range value, wherein the sets of blur parameters corresponding to each coded aperture are associated with overlapping range intervals;
   c) capturing images of the scene having a plurality of objects using each of the coded apertures;
   d) providing a set of deblurred images using the captured images from each coded aperture and each of the blur parameters from the stored set; and
   e) using the set of deblurred images to determine the range information for the objects in the scene.

18. A method of using an image capture device to identify range information for objects in a scene, comprising:
   a) providing an image capture device having an image sensor, at least two coded apertures having different spatial frequency responses, and a lens;
   b) storing in a memory a set of blur parameters derived from range calibration data for each coded aperture, using a set of blur parameters derived from calibration data at a set of range values, such that there is a set of blur parameters for each coded aperture at each corresponding range value wherein the sets of blur parameters corresponding to each coded aperture are associated with non-overlapping range intervals;
   c) capturing images of the scene having a plurality of objects using each of the coded apertures;
   d) providing a set of deblurred images using the captured images from each coded aperture and each of the blur parameters from the stored set; and
   e) using the set of deblurred images to determine the range information for the objects in the scene.

* * * * *